US 6,642,462 B2

(12) United States Patent
Ninomiya et al.

(10) Patent No.: US 6,642,462 B2
(45) Date of Patent: Nov. 4, 2003

(54) LID OPEN/CLOSE DETECTION DEVICE OF PORTABLE ELECTRONIC EQUIPMENT

(75) Inventors: Nobuyuki Ninomiya, Miyagi-ken (JP);
Hiroki Oba, Miyagi-ken (JP);
Takayuki Itabashi, Miyagi-ken (JP);
Tatsuaki Kawase, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/081,906

(22) Filed: Feb. 20, 2002

(65) Prior Publication Data
US 2002/0130019 A1 Sep. 19, 2002

(30) Foreign Application Priority Data
Mar. 15, 2001 (JP) ........................................ 2001-074477

(51) Int. Cl.⁷ .............................................. H01H 35/42
(52) U.S. Cl. ...................... 200/61.7; 361/680; 379/433; 379/434
(58) Field of Search .......................... 200/61.62, 61.7; 361/680; 379/433, 434

(56) References Cited
U.S. PATENT DOCUMENTS

| | | | |
|---|---|---|---|
| 4,066,857 A | * | 1/1978 | Suska ........................ 200/61.7 |
| 5,117,073 A | * | 5/1992 | Mischenko ................. 200/61.7 |
| 5,608,793 A | | 3/1997 | Uriya .......................... 379/387 |
| 6,011,544 A | * | 1/2000 | Sato ............................ 345/168 |
| 6,373,006 B1 | * | 4/2002 | Toki ........................... 200/61.7 |

* cited by examiner

Primary Examiner—Michael Friedhofer
(74) Attorney, Agent, or Firm—Beyer Weaver & Thomas

(57) ABSTRACT

In electronic equipment which includes a casing, a lid body which is rotatably supported on the casing, a hinge member which is formed by mounting a frame body on one of the lid body and the casing and by making a shaft body projected from the frame body rotatably support the other of the lid body and the casing, and a switch which detects rotation of the lid body, the switch is formed of an individual rotary switch which accommodates a rotary manipulation body having a hollow shaft hollow hole, a movable contact which is integrally rotated with the rotary manipulation body and a stationary contact which is brought into slide contact with the movable contact inside a housing, wherein the shaft body of the hinge member is inserted into the hollow shaft hole of the rotary manipulation body, and the rotation of the lid body is detected in response to the slide contact between the movable contact and the stationary contact which is generated along with rotation of the shaft body.

3 Claims, 7 Drawing Sheets

LID OPEN/CLOSE DETECTION DEVICE OF PORTABLE ELECTRONIC EQUIPMENT

BACKGROUND OF THE INVENTION

1. Field of the Invention

The present invention relates to a lid open/close detection device used for folding portable electronic equipment such as a portable telephone or a notebook type personal computer.

2. Description of the Related Art

In portable electronic equipment such as a portable telephone and a notebook-type personal computer, to enlarge a display screen and a key inputting part and to reduce a profile size of the equipment, folding equipment which forms a display screen on a lid body and can fold the lid body to a body side when the equipment is not used has been demanded and equipment which can meet such a demand has been popularly commercialized.

In such a situation, to detect whether the lid body is in a folded state or in an opened state, among conventional equipment, there has been known equipment which detects the open/close operation by manipulating a projection formed in the lid body such that the projection pushes a push button switch disposed in the inside of the equipment through an opening formed in the equipment or equipment which detects the open/close operation by making a magnet mounted on the lid body approach or move away from a proximity switch mounted in the inside of the equipment.

Here, the structure of a flip open/close device of a conventional portable telephone set is shown in FIG. 7 and FIG. 8. That is, FIG. 7 shows the structure which detects the opening and closing of the lid body in response to the operation of a push button switch. A casing 100 which constitutes a body is provided with a plurality of key switches 101, 101 which constitute a key inputting part. Further, in a left upper surface side of the casing 100, an opening 100a for manipulation of a push button switch is formed. At a position in the inside of the casing 100 corresponding to the opening 100a, a push button switch not shown in the drawing is provided.

On the upper surface side of the casing 100, a lid body 103 is rotatably mounted by way of a hinge portion not shown in the drawing. A display screen 104 formed of liquid crystal or the like is disposed at the center of the lid body 103. Further, on the left lower surface side of the lid body 103, a projection 103a for manipulating the push button switch is formed. Further, an antenna 105 is provided to a right upper end side of the lid body 103.

The state shown in FIG. 7 is a state in which the lid body 103 is opened for use. In this state, the push button switch disposed in the inside of the casing 100 is not yet pushed. When the lid body 103 is closed from the current state upon completion of use, the projection 103a which is formed on the lid body 103 is inserted into the opening 100a of the casing 100 so as to push the push button switch whereby the closure of the lid body 103 can be detected.

FIG. 8 shows a structure which detects the opening and closing of the lid body using a proximity switch. In this case, in a casing 100 at the left lower surface side, a proximity switch (lead switch) 107 is disposed. Further, on the left upper surface side of a lid body 103 and at a position corresponding to the proximity switch 107, a magnet 108 for manipulating the proximity switch 107 is disposed.

The use state shown in FIG. 8 is a state in which the proximity switch 107 is not yet manipulated. When the lid body 103 is closed from this state upon completion of use, the magnet 108 provided to the lid body 103 is made to approach the proximity switch 107 so that the proximity switch 107 is manipulated and the closure of the lid body 103 is detected.

However, with respect to the structure of the above-mentioned conventional lid open/close detection device, these structures can only detect whether the lid body 103 has pushed or approached the push button switch or the proximity switch 107 disposed in the inside of the casing 100. That is, these structures can only detect the folded state in which the lid body 103 covers the upper surface of the casing 100 and hence, there has been a problem that these structures cannot detect a state in which the lid body 103 is completely opened or an arbitrary angle which the lid body 103 takes with respect to the casing 100 in the course of the movement thereof from the folded state to the fully opened state.

Further, since it is necessary to ensure a space for disposing the switch in the inside of the lid body 103 or the casing 100, there has been a problem that it is difficult to make the electronic equipment have a thin thickness.

SUMMARY OF THE INVENTION

Accordingly, it is an object of the present invention to provide a lid open/close detection device of portable electronic equipment which can solve the above-mentioned drawbacks, can detect a state in which a lid body of electronic equipment is opened at an arbitrary angle and, at the same time, can make the electronic equipment have a thin thickness.

To solve the above-mentioned tasks of the conventional electronic equipment, according to a first aspect of the present invention, in portable electronic equipment which includes a casing, a lid body which is rotatably supported on the casing, a hinge member which is formed by mounting a frame body on one of the lid body and the casing and by making a shaft body projected from the frame body rotatably support the other of the lid body and the casing, and a switch which detects rotation of the lid body, the switch is formed of an individual rotary switch which accommodates a rotary manipulation body having a hollow shaft hole, a movable contact which is integrally rotated with the rotary manipulation body and a stationary contact which is brought into slide contact with the movable contact inside a housing, wherein the shaft body of the hinge member is inserted into the hollow shaft hole of the rotary manipulation body, and wherein rotation of the lid body is detected in response to the slide contact between the movable contact and the stationary contact which is generated along with rotation of the shaft body.

According to a second aspect of the present invention, the movable contact and the stationary contact are configured such that they are annularly arranged along a rotational direction of the rotary manipulation body and, at the same time, can detect a plurality of rotational positions of the lid body along with rotation of the shaft body.

According to a third aspect of the present invention, the rotary switch is formed of an encoder for detecting a rotational angle.

According to a fourth aspect of the present invention, the shaft body of the hinge member is pivotally mounted in the hollow shaft hole of the rotary manipulation body such that the shaft portion is rotated together with the rotary manipulation body in a rotational direction and is movable in an axial direction independently from the rotary manipulation body.

DETAILED DESCRIPTION OF THE PREFERRED EMBODIMENTS

Figure 4:
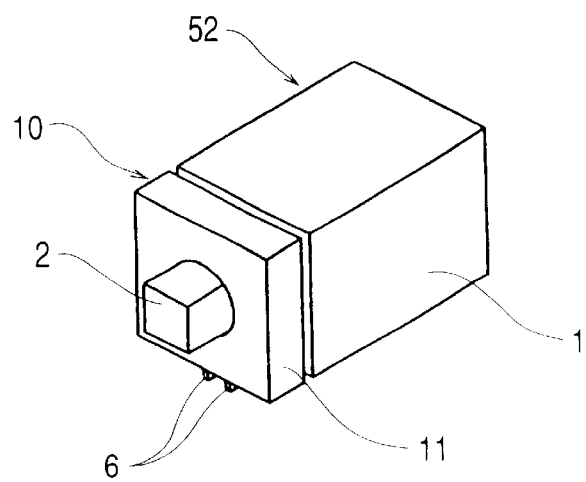
FIG. 4 is a perspective view showing the hinge member and a switch of the same open/close detection device of the present invention.
Figure 5:
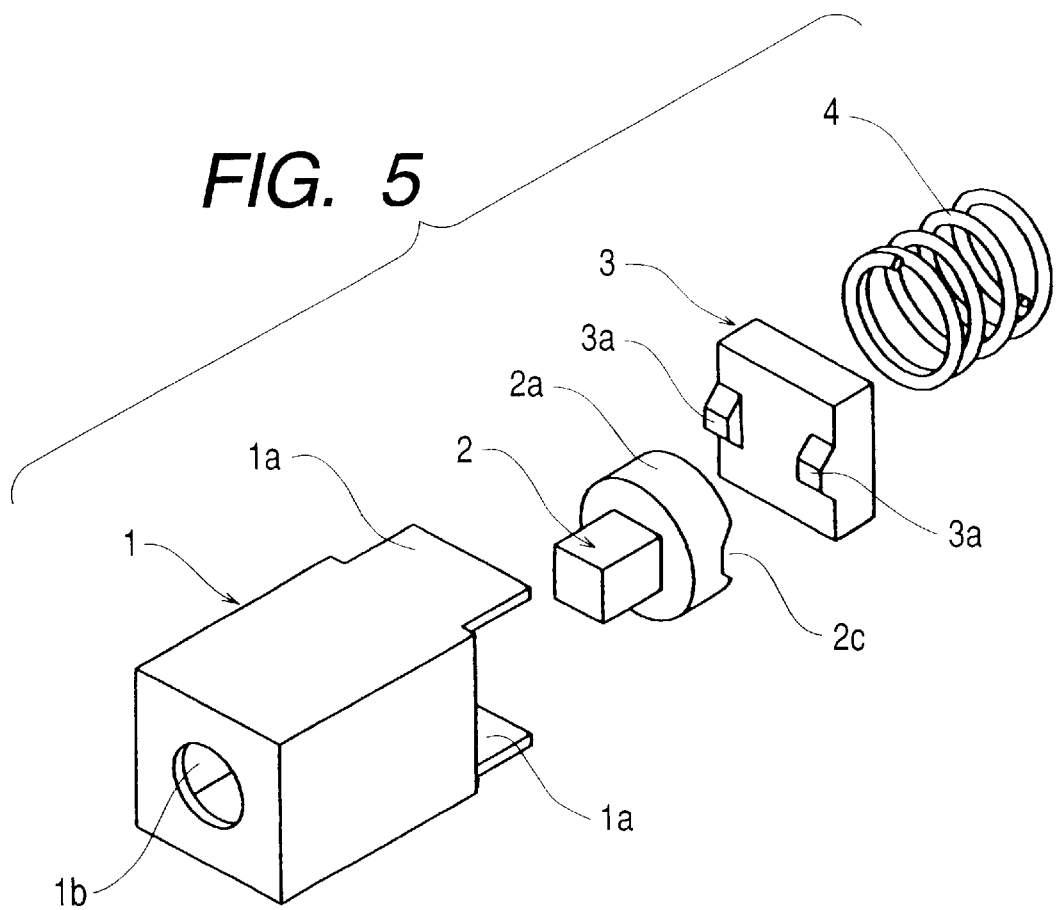
FIG. 5 is an exploded perspective view showing the hinge member of the same open/close detection device of the present invention.
Figure 6:
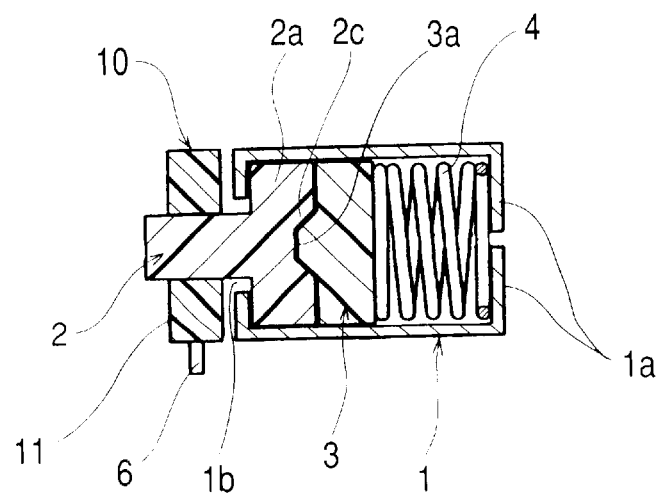
FIG. 6 is a longitudinal cross-sectional view showing the hinge member of the same open/close detection device of the present invention.
Figure 7:
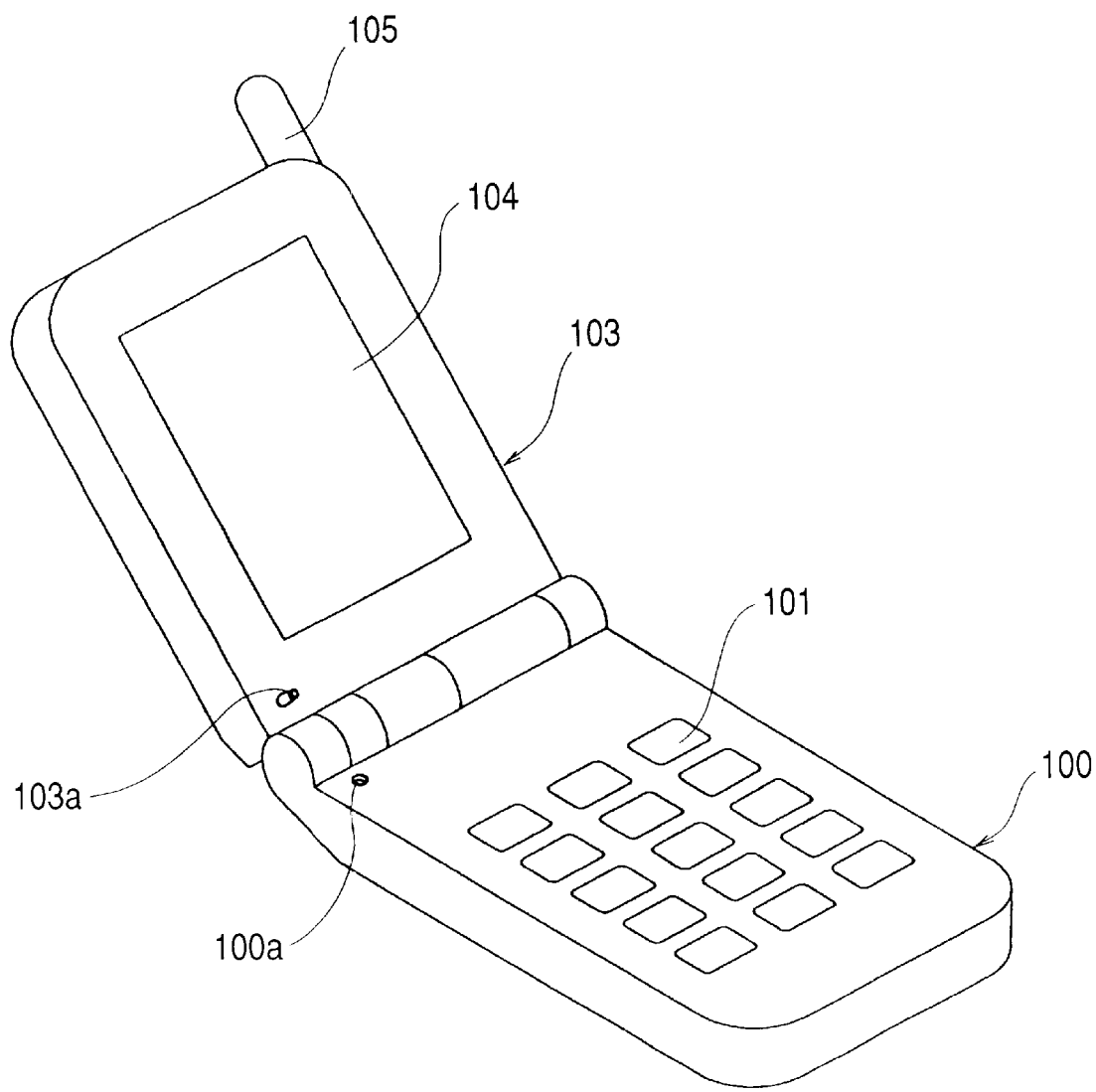
FIG. 7 is a perspective view showing a flip open/close detection device of a conventional portable telephone set.
Figure 8:
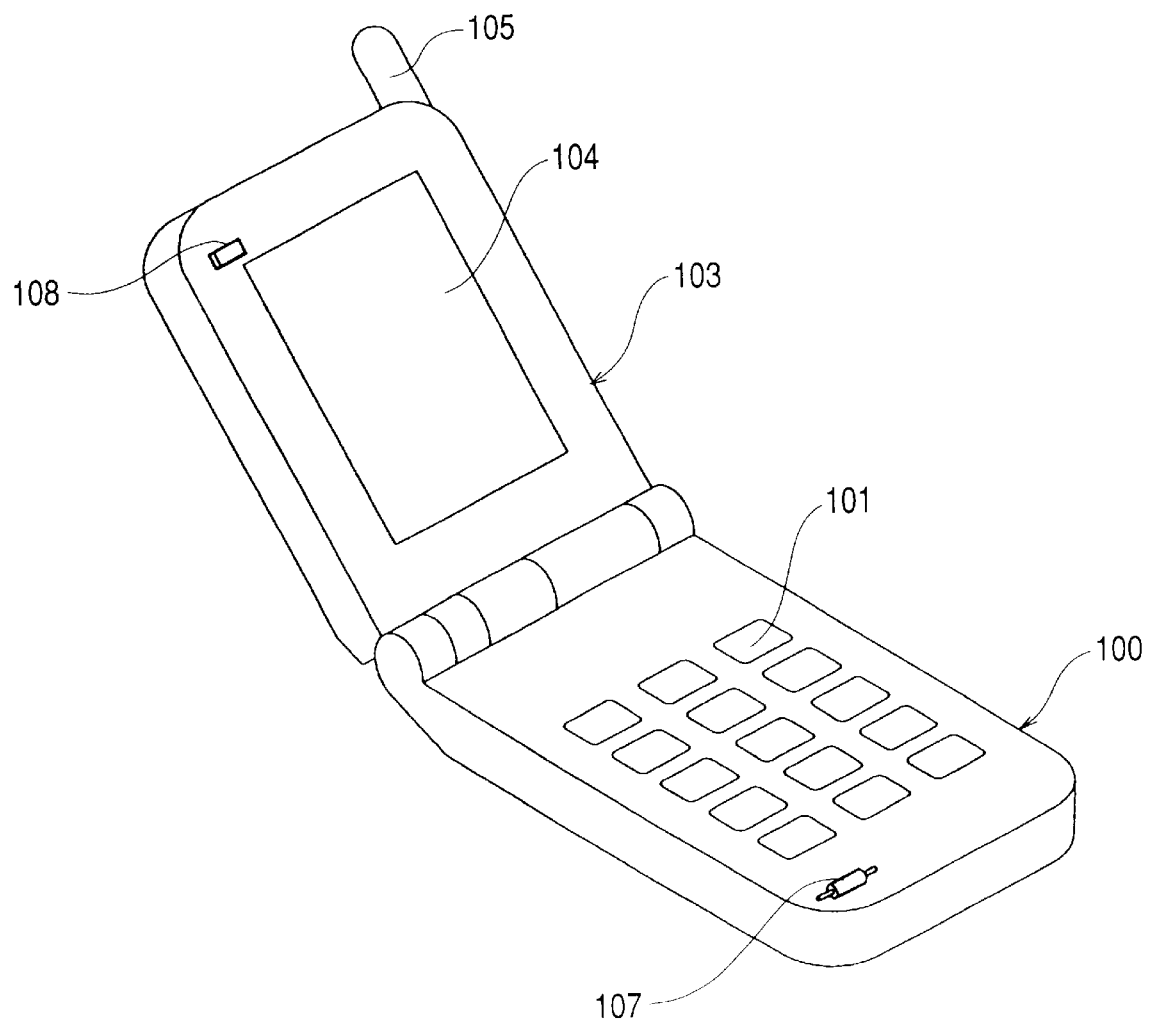
FIG. 8 is a perspective view showing a flip open/close detection device of a conventional portable telephone set.
Figure 9:
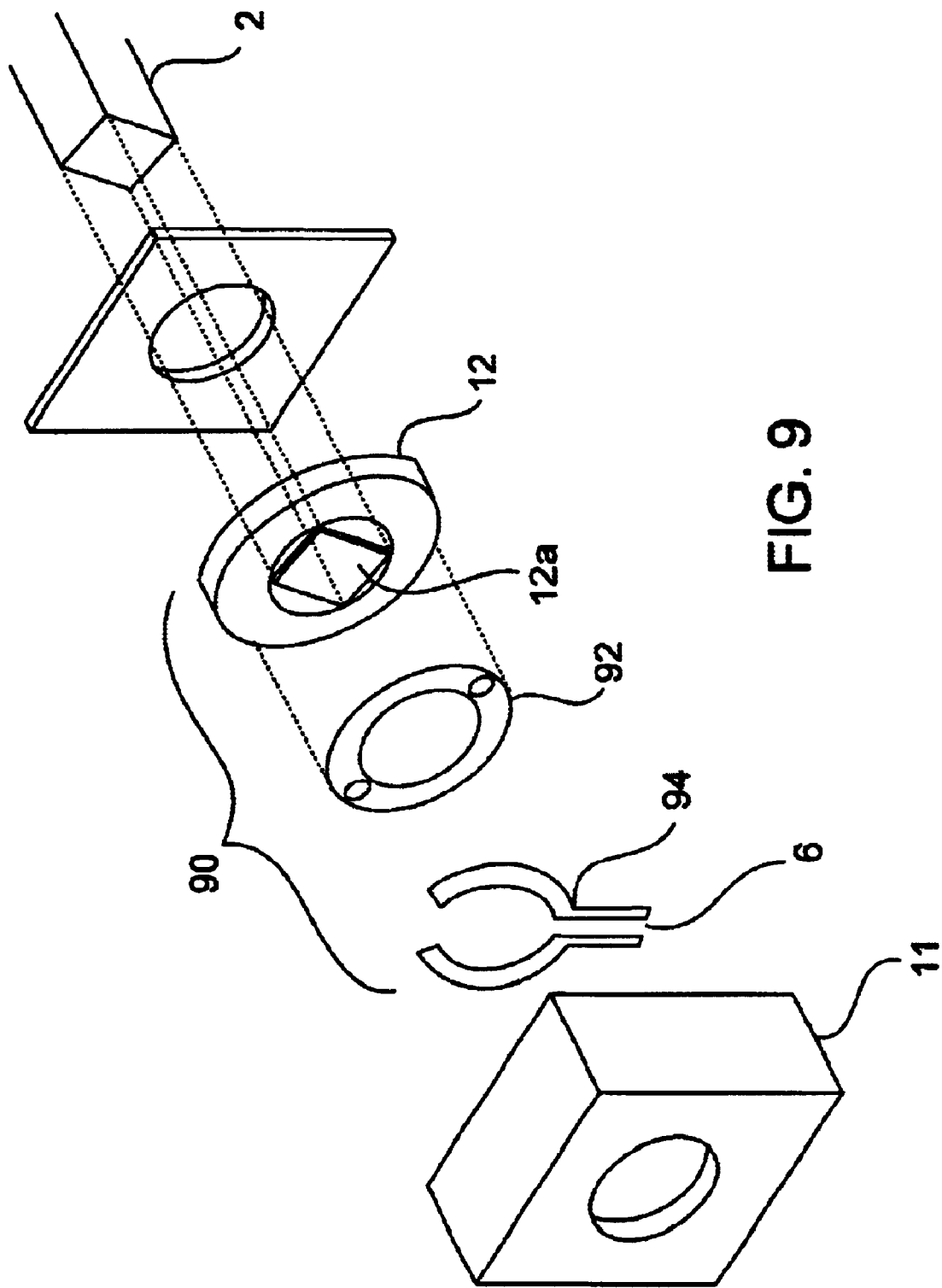
FIG. 9 is an exploded perspective view showing the movable contact being integrally rotated with the rotary manipulation body; an arrangement of the movable and stationary contacts; and an encoder included in the rotary switch according to the open/close detection device of the present invention.

An embodiment of a lid open/close detection device of portable electronic equipment according to the present invention is explained in detail in conjunction with FIG. 1 to FIG. 6 hereinafter. In the drawings, FIG. 1 is a perspective view showing a portable telephone set using an open/close detection device according to the present invention, FIG. 2 is an exploded perspective view showing a lid body and a casing in a separated state, FIG. 3 is a partial exploded perspective view showing a state in which the casing and a hinge member are engaged with each other, FIG. 4 is a perspective view showing the hinge member and a switch, FIG. 5 is an exploded perspective view showing the hinge member, and FIG. 6 is a longitudinal cross-sectional view showing the hinge member.

Figure 1:
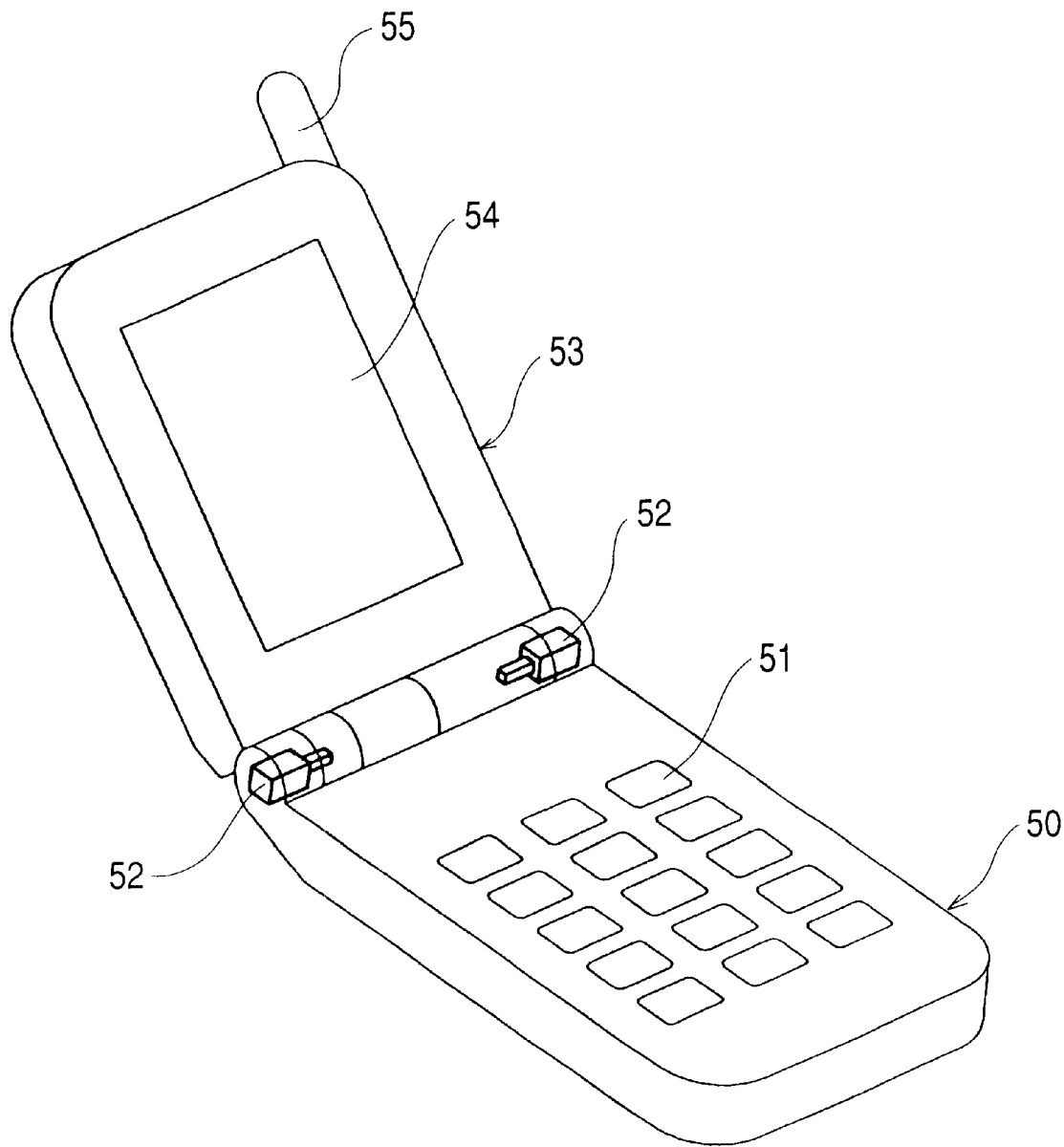
FIG. 1 is a perspective view showing a portable telephone set using an open/close detection device according to one aspect of the present invention.
Figure 2:
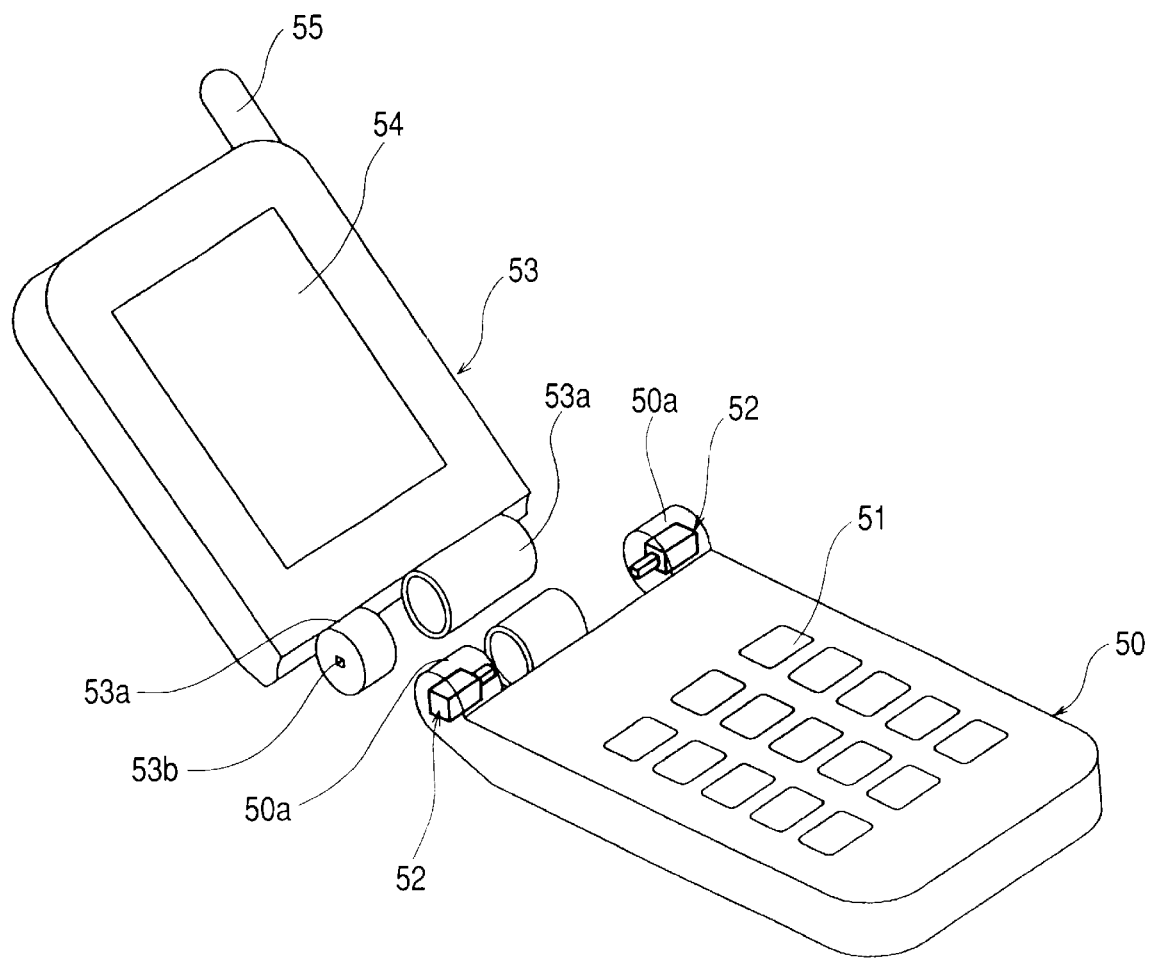
FIG. 2 is an exploded perspective view showing a lid body and a casing of the portable telephone set using the same open/close detection device of the present invention in a separated state.

FIG. 1 and FIG. 2 show a portable telephone set having a flip open/close mechanism, wherein a plurality of key switches 51, 51 which constitute a key inputting part is disposed on an upper surface of a casing 50 which constitutes a body of the portable telephone set. Further, a lid body 53 is rotatably mounted on an upper end side of the casing 50 by way of hinge members 52, 52. A display screen 54 formed of liquid crystal or the like is arranged at the center of the lid body 53. Further, an antenna 55 is provided to a right upper end side of the lid body 53.

Figure 3:
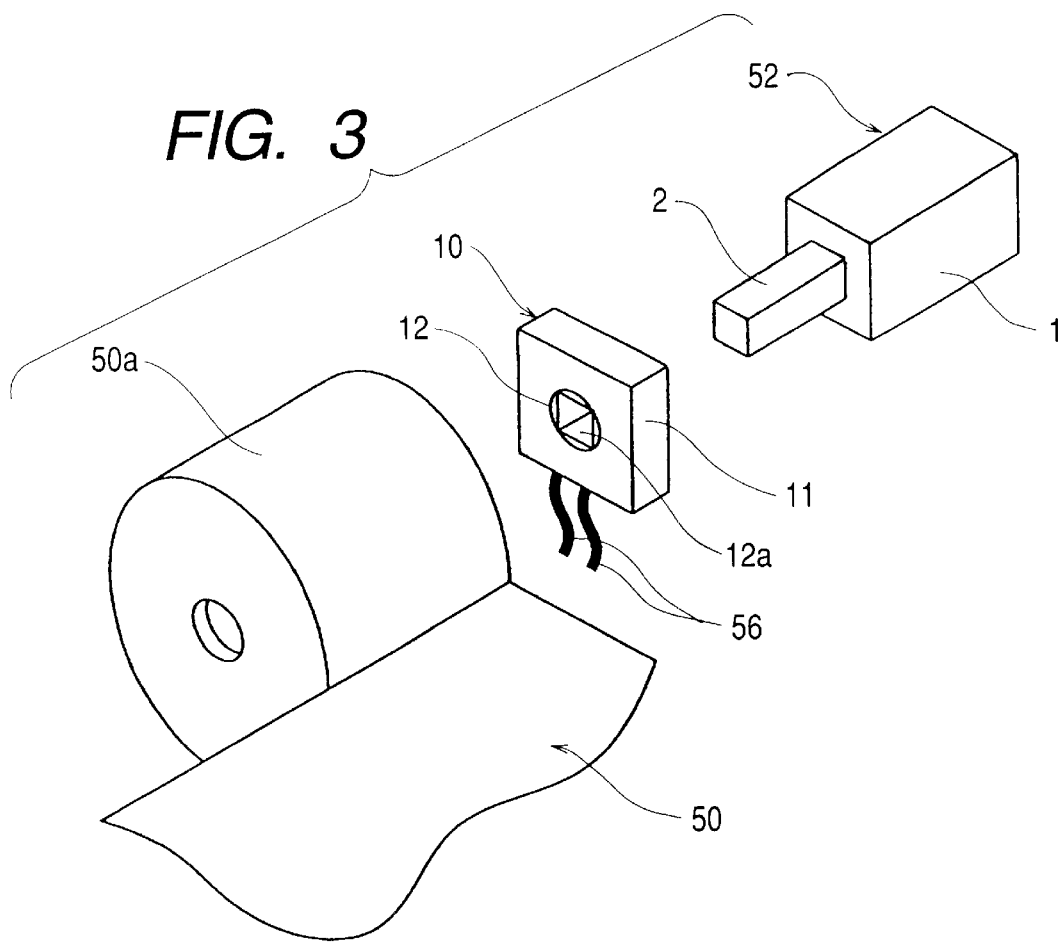
FIG. 3 is a partial exploded perspective view showing a state in which the casing and a hinge member of the portable telephone set using the same open/close detection device of the present invention are engaged with each other.

In FIG. 3, a condition in which the hinge member 52 is engaged with the housing 50 is explained. The hinge member 52 includes a rectangular parallelepiped frame body 1 which is formed by bending a metal sheet into a box shape, and a rectangular parallelepiped shaft body 2 which is rotatably supported on the frame body 1. Further, shaft body 2 is allowed to pass through a rotary switch 10. The rotary switch 10 is, when necessary, is provided with a pair of lead lines 56 for connection or the like connected to a terminal 6 which will be explained later and is electrically communicated with an electric circuit not shown in the drawing which is accommodated inside the casing 50.

The hinge member 52 and the rotary switch 10 are fixedly secured in the inside of a casing-side rotary base portion 50a which is projected from a side end of the housing 50 such that the frame body 1 of the hinge member 52 and the housing 11 of the rotary switch 10 are not rotated. Further, the shaft body 2 of the hinge member 52 is inserted into and supported by a shaft engaging hole 53b formed in a lid-body-side rotary proximal portion 53a which is projected from a side end of the lid body 53. In this manner, the lid body 53 is rotatably mounted on the casing 50 such that the lid body 53 is rotatable along with the rotation of the shaft body 2 supported on the lid body 53 inside the frame body 1. That is, and the lid body 53 is rotatably supported on the housing 50 by way of the hinge members 52.

Subsequently, the structure of the hinge member 52 is explained. As shown in FIG. 4 to FIG. 6, the frame body 1 is formed by bending a metal sheet or the like into a rectangular parallelepiped box shape using press forming. The frame body 1 has an opened portion at one end thereof and a pair of bending lugs 1a, 1a are formed on side peripheral portions of the opened portion in an opposed manner. A shaft hole 1b which constitutes a through hole is formed in the other end side of frame body 1 which is disposed opposite to the opened portion.

The shaft body 2 is made of insulation material such as synthetic resin and is formed in a rectangular shaft shape. Further, a disc-like rotary plate 2a is integrally formed on one-end side of the shaft body 2. To a back surface side of the rotary plate 2a, cam recesses 2c for positioning which are formed on a plane perpendicular to the shaft portion in a spaced-apart manner and are formed wider than the shaft portion are provided. The shaft body 2 is inserted into the shaft hole 1b of the frame body 1 and is rotatably supported on the frame body 1 along with the rotary plate 2a.

A positioning plate 3 is made of insulation material such as synthetic resin and is formed in a rectangular parallelepiped shape. On one-end surface of the positioning plate 3, cam projections 3a which are engaged with the cam recesses 2c of the rotary plate 2a so as to position the rotation of the shaft body 2 to given rotational positions are formed. Further, on a back-surface side of the positioning plate 3 which is disposed opposite to the surface on which the cam projections 3a are formed, a spring receiving portion which is brought into contact with a spring member 4 is formed. Due to such a constitution, the cam projections 3a of the positioning plate 3 are biased to the cam recess 2c side of the rotary plate 2a.

The spring member 4 is constituted of a coil spring which is wound in a coil shape. The spring member 4 has one end thereof brought into contact with the spring receiving portion of the positioning plate 3 and the other end brought into contact with a spring receiving portion which is formed at one-end side of the frame body 1 by bending the bending lugs 1a. Due to such a constitution, the spring member 4 is accommodated inside the frame body 1 in a state that the positioning plate 3 is biased to the rotary plate 2a side.

The rotary switch 10 is constituted of an encoder 90 served for detecting a rotational angle and includes a housing 11 which is made of insulation material such as synthetic resin and is formed in a box-like parallelepiped shape, a rotary manipulation body 12 which is rotatably accommodated inside the housing 11 and has a hollow shaft hole 12a into which the shaft body 2 of the hinge member 52 is inserted, a movable contact 92 in the drawing which is engaged with and is integrally rotated with the rotary manipulation body 12, and a stationary contact 94 in the drawing which is disposed in the housing 11 and is brought into slide contact with the movable contact 92.

Here, the movable contact 92 is made of a conductive metal sheet having spring characteristics and is formed in an annular shape. The movable contact 92 is disposed in the inside of the rotary manipulation body 12 such that the movable contact 92 is formed in an annular shape along the rotational direction of the rotary manipulation body 12. Further, the stationary contact 94 is also made of a conductive metal sheet and is formed in an annular shape. The stationary contact 94 is disposed in the housing 11 in a state that the stationary contact 94 has one-end side thereof exposed.

The movable contact 92 and the stationary contact 94 are respectively disposed such that they are formed in an annular shape along the rotational direction of the rotary manipulation body 12. Due to such a constitution, along with the rotation of the shaft body 2, the movable contact 92 is slidably moved on the stationary contact 94 and is brought into contact with or separated from the stationary contact 94 whereby a plurality of rotational positions of the lid body 53 can be detected.

Further, the terminal portions 6 which are extended from the stationary contact are provided to the lower-end side of the housing 11. These terminal portions 6 are, when necessary, connected with an electric circuit not shown in the drawing accommodated in the inside of the casing 50 by way of lead lines 56.

Subsequently, the manner of operation of the hinge members 52 and the rotary switch 10 is explained. In the state that the hinge members 52 and the rotary switch 10 are mounted on the casing 50 and the lid body 53, when the lid body 53 assumes the folded state, as shown in FIG. 6, since the rotary plate 2a which is integrally formed with the shaft body 2 is biased by the biasing force of the spring member 4 due to the engagement of the cam recesses 2c served for positioning the rotary plate 2a with the cam projections 3a for positioning formed on the positioning plate 3, the lid body 53 is stopped in the state that the lid body 53 covers the casing 50. In this state, the movable contact and the stationary contact which are accommodated in the inside of the housing 11 of the rotary switch 10 which allows the insertion of the shaft body 2 therein are separated so that the switch assumes the OFF state.

Then, when the lid body 53 assumes the opened position, along with the opening of the lid body 53, the shaft body 2 which is supported on the hinge member 52 is rotated and the rotary plate 2a which is integrally formed with the shaft body 2 is also rotated. Accordingly, the cam recesses 2c served for positioning are moved away from the cam projections 3a of the positioning plate 3 against the biasing force of the spring member 4 and the rotary plate 2a is rotated. Here, the movable contact which is accommodated inside the housing 11 of the rotary switch 10 is brought into contact with the stationary contact so that the switch assumes the ON state.

When the lid body 53 is further opened to a position of an arbitrary angle from the above-mentioned state, since the movable contact and the stationary contact which are accommodated inside the housing 11 of the rotary switch 10 are annularly arranged along the rotational direction of the rotary plate 2a, a contact of the movable contact is brought into annular slide contact with the stationary contact along with the rotation of the shaft body 2.

Accordingly, by adopting the constitution in which the stationary contact which is annularly arranged in the inside of the housing 11 of the rotary switch 10 is brought into contact with the contacts of the movable contact at a plurality of arbitrary positions respectively, a plurality of rotational positions of the shaft body 2, that is, a plurality of rotational positions of the lid body 53 can be detected whereby an arbitrary opened state of the lid body 53 can be detected by detecting the rotation of the shaft body 2 of the hinge member 52.

Further, since the rotary switch 10 which constitutes the switch is incorporated inside the lid-body-side rotary proximal portion 53a and the casing-side rotary proximal portion 50a which are respectively projected from the lid body 53 and the casing 50, the constitution can prevent the increase of thickness of a body of the portable telephone set when the lid body 53 and the casing 50 are superposed on each other in the state that they are folded to each other.

Further, since the rotary switch 10 is constituted of the individual encoder for detecting the rotational angle, by changing the kind of the encoder when necessary, the lid open/close device can cope with the variety of detection which comprises various kinds of rotational angles.

Further, the shaft body 2 of the hinge member 52 is integrally rotated with the hollow shaft hole 12a of the rotary manipulation body 12 in the rotational direction and is independently movable from the hollow shaft hole 12a in the axis direction. Accordingly, the detection of the arbitrary open position of the lid body 53 can be obtained by merely providing one kind of hinge member 52. Further, the engagement and the mounting of the rotary switch 10 which detects the rotational angle with or to the shaft body 2 and the casing 50 is facilitated so that the operability of assembling operation is enhanced.

As has been described heretofore, according to the present invention, in the open/close detection device of the portable electronic equipment which includes the casing, the lid body which is rotatably supported on the casing, the hinge member which is formed by mounting the frame body on one of the lid body and the casing and by making the shaft body projected from the frame body rotatably support the other of the lid body and the casing, and the switch which detects the rotation of the lid body, the switch is formed of the individual rotary switch which accommodates the rotary manipulation body having the hollow shaft hollow hole, the movable contact which is integrally rotated with the rotary manipulation body, the stationary contact which is brought into slide contact with the movable contact inside the housing, wherein the shaft body of the hinge member is inserted into the hollow shaft hole of the rotary manipulation body, and the rotation of the lid body is detected in response to the slide contact between the movable contact and the stationary contact which is generated along with the rotation of the shaft body. Accordingly, the open/close detection device can detect a plurality of rotational positions of the shaft body, that is, a plurality of rotational positions of the lid body, whereby the arbitrary opened position of the lid body can be detected by the rotation of the shaft body of the hinge member. Further, since the switch is disposed in the inside of the rotary proximal portions of the lid body and the casing in the same manner as the hinge member, it is possible to make the body of the electronic equipment have a thin thickness.

Further, according to the present invention, the movable contact and the stationary contact are configured such that they are annularly arranged along the rotational direction of the rotary manipulation body and, at the same time, can detect a plurality of rotational positions of the lid body along with the rotation of the shaft body. Accordingly, a plurality of rotational positions can be detected with one switch so that space necessary for mounting the switch can be minimized.

Further, according to the present invention, the rotary switch is formed of the encoder for detecting a rotational angle and hence, the lid open/close device can cope with the variety of detection which comprises various kinds of rotational angles by changing the kind of the encoder when necessary.

Further, according to the present invention, the shaft portion of the hinge member is mounted in the hollow shaft hole of the rotary manipulation body such that the shaft portion is rotated together with the rotary manipulation body in a rotational direction and is movable in an axial direction independently from the rotary manipulation body. Accordingly, it is possible to cope with the drawbacks of the conventional lid open/close device by merely providing one kind of hinge member 52, and the engagement and the mounting of the rotary switch which detects the rotational angle with or to the shaft body and the casing is facilitated so that the operability of assembling operation is enhanced.

What is claimed is:

1. A lid angle detection device of portable electronic equipment which includes a casing, a lid body which is rotatably supported on the casing, a hinge member which is formed by mounting a frame body on one of the lid body and the casing and by making a shaft body projected from the frame body rotatably supporting the other of the lid body and the casing, and a switch which detects the rotation of the lid body, wherein the switch is formed of an individual rotary switch which accommodates a rotary manipulation body having a hollow shaft hole, a movable contact which is integrally rotated with the rotary manipulation body and a stationary contact which is brought into slide contact with the movable contact inside a housing, wherein the shaft body of the hinge member is inserted into the hollow shaft hole of the rotary manipulation body, and wherein rotation of the lid body is detected in response to the slide contact between the movable contact and the stationary contact which is generated along with rotation of the shaft body, wherein the shaft body of the hinge member is pivotally mounted in the hollow shaft hole of the rotary manipulation body such that the shaft body is rotated together with the rotary manipulation body in a rotational direction and is movable in an axial direction independently from the rotary manipulation body.

2. A lid angle detection device of portable electronic equipment according to claim 1, wherein the movable contact and the stationary contact are configured such that they are annularly arranged along a rotational direction of the rotary manipulation body and can detect a plurality of rotational positions of the lid body along with rotation of the shaft body.

3. A lid angle detection device of portable electronic equipment according to claim 1, wherein the rotary switch is formed of an encoder for detecting a rotational angle.

* * * * *